3,045,049
HALOGEN CONTAINING ORGANIC DERIVATIVES OF DECABORANE
Sheldon L. Clark, Eggertsville, and Delmer A. Fidler, Niagara Falls, N.Y., assignors to Olin Mathieson Chemical Corporation, a corporation of Virginia
No Drawing. Filed Jan. 27, 1959, Ser. No. 789,443
12 Claims. (Cl. 260—606.5)

This application is a continuation-in-part of each of our copending applications Serial Nos. 733,244 and 733,242, both filed May 1, 1958, both now abandoned.

This invention relates to new chemical compounds of the class $B_{10}H_{13}$—CH(R)—X wherein R is hydrogen or methyl and X is bromine or chlorine. This invention also relates to a method for the preparation of the aforementioned class of compounds. In addition, this invention relates to the compound $B_{10}H_{13}$—CHBr—$B_{10}H_{13}$. The aforementioned compounds are useful ingredients in solid propellant compositions when admixed with suitable oxidizer salts, such as various perchlorates or ammonium nitrate.

The compounds of the class $B_{10}H_{13}$—CH(R)—X wherein R and X have the significance given above are prepared in accordance with this invention by reacting methylene bromide or chloride or ethylidene bromide or chloride or ethylene bromide or chloride and decaborane while the reaction mixture contains a suitable amount of a Friedel-Crafts type catalyst, particularly aluminum bromide or chloride or ferric chloride or bromide, except that where ethylene bromide or chloride is used, the catalyst is aluminum chloride or bromide. The relative amounts of reactants utilized in carrying out the reaction can be varied considerably, but generally the molar ratio of the methylene or ethylidene halide to decaborane will be within the range from 0.2 to 2 while the molar ratio of ethylene halide to decaborane will be within the range from 0.1:1 to 2:1. Further, as the specific examples set forth below illustrate, the amount of catalyst present in the reaction mixture is subject to wide variation, but preferably from 0.01 to 2 moles of the catalyst per mole of decaborane are present in the reaction mixture. The temperature employed in carrying out the reaction is preferably within the range from 50° C. to 200° C., although somewhat higher and somewhat lower temperatures can also be utilized, if desired.

The following examples illustrate the invention.

*Example I*

Aluminum bromide, 10.4 grams (0.4 mole), 48.8 grams (0.4 mole) decaborane and 17.2 grams (0.2 mole) of methylene chloride were placed in a 200 ml. flask fitted with a reflux condenser and nitrogen inlet. Hydrogen chloride evolved slowly and was passed into a trap of distilled water. The reaction mixture was heated to a temperature of 60° C. at which point the mixture became fluid and the evolution of hydrogen chloride became more vigorous. When the reaction mixture became liquid, it was stirred by means of a magnetic stirrer. Stirring and heating at 60 to 70° C. were continued for approximately one hour at which time the evolution of hydrogen chloride had stopped. The mixture was cooled to room temperature and hydrolyzed by pouring over crushed ice and water. This mixture was stirred for approximately five minutes to decompose all the excess aluminum bromide and the product was extracted from the water with benzene. The use of benzene offered an advantage in that any water present was removed with the benzene as an azeotrope during the distillation which followed. After the benzene had been removed, the remaining material was transferred to a smaller flask.

Distillation of the crude reaction liquid under reduced pressure gave 30.4 grams of liquid boiling at 80° to 100° C. at 1 mm. of mercury absolute pressure. A total of 16.0 grams of unreacted decaborane was recovered. Redistillation of the 30.4 grams of liquid gave 16.0 grams of a material boiling at 97–100° C. (1.4 mm.). This material was identified as chloromethyldecaborane ($B_{10}H_{13}$—$CH_2Cl$) by an infrared analysis. The chloromethyldecaborane, which solidified upon cooling, was recrystallized from n-pentane to produce a white crystalline solid having a melting point of 52 to 53.5° C.

*Example II*

This example was conducted similarly to and in the same apparatus as Example I.

In a first experiment 24.4 grams (0.2 mole) of decaborane, 8.5 grams (0.1 mole) of methylene chloride and 5.24 grams (0.02 mole) of aluminum bromide were charged to the reactor. The reaction mixture was heated at 60 to 80° C. for 60 minutes. The mixture was allowed to cool to room temperature and was then poured over crushed ice into ice water. This mixture was stirred until all the aluminum bromide had been hydrolyzed (about five minutes). The aqueous mixture was extracted with benzene. The benzene solution was then distilled at atmospheric pressure to remove the benzene and water. When the head temperature reached 90° C., the heating was terminated and the flask cooled to room temperature. The benzene remaining was removed under reduced pressure, and the remaining materials distilled. 2.7 grams of a liquid boiling at 90–100° C. (0.33 mm. of mercury absolute pressure) were obtained.

A second experiment identical with the first was conducted at a reaction temperature of 60 to 70° C. An infrared analysis of the liquid, 8.0 grams boiling at 85–100° C. (0.3 mm.), was identical to the liquid obtained in the example described in the preceding paragraph.

The two liquid products obtained from these two experiments were combined and distilled through a short column packed with glass helices. The distillation was conducted at a very slow rate at a pressure of 7 to 8 mm. of mercury absolute. Unreacted decaborane was removed in the fractionation head before the liquid vapors were condensed. This distillation yielded 5.4 grams of chloromethyldecaborane which was recrystallized from n-pentane to produce a white crystalline solid having a melting point of 52 to 53.5° C. The elemental analysis of the chloromethyldecaborane showed that it contained 64.8, 64.7 percent by weight boron, and 20.2, 20.9 weight percent chlorine. The molecular weight determined by experiment was 170, 169. These elemental analyses and molecular weight determinations compare favorably with those calculated for chloromethyldecaborane, which are 63.4 weight percent boron, 20.8 weight percent chlorine and molecular weight of 170.7.

*Example III*

The reaction of methylene bromide with decaborane under the same conditions previously described for the preparation of chloromethyldecaborane gave bromomethyldecaborane.

In this experiment 48.8 grams (0.4 mole) of decaborane, 34.8 grams (0.2 mole) of methylene bromide and 10.4 grams (0.02 mole) of aluminum bromide were placed in a 200 ml. flask and heated to 60° C. The mixture at this temperature became fluid and stirring with a magnetic stirrer was begun. The mixture was heated at 90 to 100° C. with continued stirring for 65 minutes, at which time evolution of hydrogen bromide ceased. The reaction mixture was cooled, hydrolyzed, then extracted with benzene. The benzene was removed by distillation and the remaining liquid distilled under reduced pressure. A liquid 26.5 grams, boiling at 100–130° C. (1.3 mm.), was obtained. The unreacted decaborane recovered weighed 14 grams. The work up of the residue of 5 grams remaining in the flask will be discussed in the paragraph following the next one.

The 26.5 grams of liquid were redistilled through a short column packed with glass helices. An additional 6 grams of unreacted decaborane were recovered in this manner. This gave a total of 20 grams of decaborane recovered or a conversion of 41 percent. The liquid remaining after removal of the decaborane was distilled. Fraction 2 of the distillation boiling at 105 to 111° C. at a pressure of 1.7 mm. contained 54.3, 53.6 percent boron and 36.4, 35.9 percent bromine. This liquid weighing 17.5 grams was redistilled. A small amount of additional decaborane was also recovered in this distillation. A fraction boiling between 107 and 111° C. at a pressure of 1.5 mm. and weighing 14 grams was recovered and was bromomethyldecaborane $$(B_{10}H_{13}-CH_2Br)$$

Thus, elemental analysis showed that it contained 37.6, 38.0 weight percent bromine and 51.7, 51.8 weight percent boron. This corresponds favorably to a calculated bromine and boron analysis of 37.0 and 50.2 for the compound bromomethyldecaborane. The compound had a melting point of 48 to 50.5° C. The molecular weight was determined by experiment to be 206, 204 which corresponds to the calculated molecular weight of 215 for bromomethyldecaborane.

An infrared analysis of the 5 grams of residue remaining in the original distillation flask showed a slight resemblance to alkylated decaboranes. The solid was melted and then cooled at −78° C. for one hour. The solid was pulverized to a powder which was only partially soluble in carbon tetrachloride. A molecular weight calculated from the freezing point depression of benzene was 323 (321, 324). The solid contained 64.5, 64.0 weight percent boron and 26.3, 27.7 weight percent bromine. These data show that the compound was

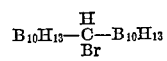

having a calculated boron content of 64.5 weight percent, a calculated bromine content of 24 percent and a calculated molecular weight of 335.

Example IV

A 200 ml. flask was charged with 61 grams (0.5 mole) of decaborane and 8.0 grams (0.06 mole) of aluminum chloride. The decaborane and aluminum chloride were heated until molten and agitation was begun. Ethylidene chloride, 25 grams (0.25 mole), was added dropwise to the molten mixture over a period of 30 minutes and the temperature of the reactor was gradually raised to 120° C. The evolution of hydrogen chloride ceased when all of the ethylidene chloride had been added. A total evolution of 0.18 mole of hydrogen chloride was obtained. After 90 minutes the reaction was terminated and the products isolated as in the preceding examples. No ethylidene chloride was recovered. A liquid boiling between 84 and 105° C. at an absolute pressure of 0.5 mm. of Hg and weighing 40 grams was isolated together with 15.5 grams of decaborane and 10 grams of a polymeric solid. A 75 percent conversion of decaborane was obtained.

The 40 grams of liquid were dissolved in 125 ml. of pentane and maintained at −60° C. for 30 minutes. Four grams of a white solid were filtered from the solution and identified as chlorodecaborane by an infrared analysis. The pentane was removed under reduced pressure and the remaining liquid ("Fraction 1 dissolved in n-pentane" of Table I) distilled through a column packed with glass helices. Distillations and recrystallizations yielded ethyldecaboranes, additional chlorodecaborane and alpha-chloroethyldecaborane ($B_{10}H_{13}$—CHCl—$CH_3$) as shown in Table I.

TABLE I

| Distillation Fractions | Boiling Point, °C. | Absolute Pressure, mm. Hg | Weight, g. | Boron, Percent | Chlorine, Percent | Mol. Wt. | Remarks |
|---|---|---|---|---|---|---|---|
| 1 — Fraction 1 dissolved in n-pentane. | 84–105 | 0.5 | 40.0 | | | | 7 g. of polymeric solids also obtained. Contained 72.5% boron and 10.7% chlorine. |
| —1 | | | 4.0 | | | | n-Pentane cooled to −60° C. and 4 g. of chlorodecaborane was removed by filtering. |
| —2 | 25–76 | 2 | 3.0 | | | | ⎫ Fractions 2, 3 and 4 are shown to be mainly |
| —3 | 80–84 | 2 | 1.7 | | | | ⎬ ethylated decaborane by their infrared spectra. |
| —4 | 86–96 | 2 | 1.5 | | | | ⎭ |
| —5 | 99–103 | 2 | 5.1 | | | | Infrared analysis showed chlorodecaborane with a weak C–H absorption impurity possibly ethylchlorodecaborane. |
| —6 | 104–105 | 2.1 | 5.2 | | | | |
| —7 | 105–106 | 2.1 | 3.3 | a 65.8 | | a 154 | |
| —8 | 105–108 | 2.1 | 2.2 | | | | |
| Combined and redistilled. | | | | | | | |
| —1 | 80–84 | 1.0 | 2.2 | | | | ⎫ Mainly ethylated decaborane and some chlorodecaborane as shown by infrared spectra. |
| —2 | 84–84.5 | 1.0 | 1.1 | | | | ⎬ |
| —3 | 84.5–85 | 1.0 | 2.1 | | | | ⎭ |
| —4 | 86–86.5 | 1.0 | 2.3 | a 66.79 | a 24.68, 24.75 | a 154 | Contains a weak C–H absorption band. Resembles chlorodecaborane, M.P. 40–55° C. |
| —5 | 86.5–87 | 1.0 | 1.6 | | | | ⎫ |
| —6 | 88–89 | 1.0 | 1.6 | | | | ⎬ Resembles Fraction 8 or original distillation. |
| —7 | 91–115 | 1.0 | 2.4 | | | | ⎭ |
| Combined and recrystallized twice from n-pentane. —1 | | | 1.7 | a 66.60, 66.92 | a 23.39, 23.25 | a 154 | C–H impurity removed, M.P. 66–67° C. |
| —9 | 111–115 | 2.1 | 4.5 | b 60.23, 60.09 | b 17.98, 18.05 | b 176, 177 | ⎫ Fractions 9 and 10 are similar by infrared analysis. They have a strong C–H absorption and are alpha-chloroethyldecaborane. |
| —10 | c 115–150 | 2.1 | 3.0 | | | | ⎭ | a Anal. Calcd. for $B_{10}H_{13}Cl$: $B_2$ 68.8; $Cl_2$ 22.6; mol. wt. 156.
b Anal. Calcd. for $B_{10}H_{13}CHClCH_3$: $B_2$ 58.6; $Cl_2$ 19.3; mol. wt. 184.5.
c Superheating occurred.

The 10 grams of polymeric solids obtained in the original reaction mixture were damp with a trace of liquid. The solid was melted in a 50 ml. flask and then attached to a simple distillation apparatus which was attached to a vacuum manifold. The pressure was reduced to $5 \times 10^{-3}$ mm. of Hg absolute and heating was started. After about two hours at a pot temperature of 220° C., one gram of a liquid was collected overhead and the solids became quite dry. An infrared analysis of the liquid product showed that it was an ethylated decaborane. An elemental analysis showed that the liquid contained 57.7, 57.4 weight percent boron and 15.0, 15.0 weight percent chlorine. The molecular weight was 191 and hence the liquid was alpha-chloroethyldecaborane which has a molecular weight of 185 by calculation.

The dry solids, 7 grams, were pulverized and analyzed. They contained 72.8, 72.2 weight percent boron and 10.4, 11.0 weight percent chlorine.

*Example V*

The same apparatus and general procedure previously described was employed in this experiment.

Decaborane, 24.4 grams (0.2 mole), and 9.7 grams (0.05 mole) of ferric chloride were maintained at approximately 135° C. while ethylidene chloride, 10 grams (0.1 mole), was added dropwise over a period of 15 minutes. The evolution of hydrogen chloride ceased after all of the ethylidene chloride had been added. A total evolution of 0.01 mole of hydrogen chloride was obtained. The reaction mixture was allowed to cool and then extracted with benzene. A solid material, 11 grams, which was insoluble in benzene was filtered and dried. The solid is soluble in water and is probably a complex containing $FeCl_3$. The benzene was removed under reduced pressure and the remaining liquid was distilled. A liquid, 8 grams, boiling at 70 to 82° C. at a pressure of 0.8 mm. of Hg absolute was obtained together with 13 grams of unreacted decaborane. A sample of the liquid submitted for an infrared spectrum showed that it contained a large amount of decaborane and some ethyldecaborane as well as chloromethyldecaborane. The liquid was dissolved in n-pentane and cooled to −78° C. Chlorodecaborane, 3.5 grams, was removed upon filtering the cooled solution.

The pentane was removed under reduced pressure and the liquid was redistilled in an effort to remove all solids and remaining decaborane. The distillation was performed at a pressure of 0.65 mm. of Hg absolute and 1.7 grams of alpha-chloroethyldecaborane, as identified by molecular weight, elemental and infrared analysis, was obtained. This example is summarized in Table II.

TABLE II

| Distillation Fractions | Boiling Point, °C. | Absolute Pressure, mm. Hg | Weight, g. | Boron, Percent | Chlorine, Percent | Mol. Wt. | Remarks |
|---|---|---|---|---|---|---|---|
| 1 | 70–82 | 0.8 | 8.0 | | | | Liquid partially solidified. |
| Dissolved in n-pentane | | | | | | | |
| –1 | | | 3.5 | | | | n-Pentane solution cooled to −60° C. and 3.5 g. chlorodecaborane removed on a filter. |
| Fraction 1 recrystallized from n-pentane. | | | | | | | |
| –1 | | | 1.0 | 69.63 | 22.45 22.38 | | Solid which separated from n-pentane only on slight cooling. |
| –2 | | | 2.0 | | | | Solid obtained on prolonged cooling of the remaining n-pentane solution. |
| –2 | 75–80 | 1.3 | 3.0 | | | | Liquid obtained after removing the n-pentane. Contains some chlorodecaborane or decaborane. |
| Fraction 2 redistilled | | | | | | | |
| –1 | 72–76 | 0.65 | 0.7 | | | | A mixture of ethyldecaboranes and some decaborane, as shown by infrared analysis. |
| –2 | 80–85 | 0.65 | 1.7 | b 63.48 63.96 | b 17.54 17.86 | b 182 | Alpha-chloroethyldecaborane with some chloromethyldecaborane, which can be removed upon further distillation. | b Anal. Calcd. for $B_{10}H_{13}CHClCH$: $B_2$ 58.6; $Cl_2$ 19.3; mol. wt. 184.5.

*Example VI*

The same general procedure described for reactions of ethylidene chloride and decaborane was conducted at an increased pressure.

The reactants, 24.4 grams (0.2 mole) of decaborane, 10.0 grams (0.1 mole) of ethylidene chloride and 9.7 grams (0.06 mole) of ferric chloride were placed in an autoclave bomb and heated to 150° C. over a period of 45 minutes. A pressure of 100 p.s.i.g. developed at this temperature. The autoclave was maintained at this temperature and pressure for an additional 50 minutes. Upon cooling to room temperature, the pressure dropped from 100 to 50 p.s.i.g. The bomb was vented and 0.075 mole of hydrogen chloride was collected. The reaction mixture was washed from the autoclave with benzene and an insoluble, gray solid was removed by filtration. The solid weighed 12.0 grams. The benzene solution was washed once with water and dried with magnesium sulfate. The benzene was removed under reduced pressure. The remaining liquid, 14.7 grams, was distilled at 71 to 79° C. at 0.45 mm. of Hg pressure absolute. The unreacted decaborane weighed 8 grams.

The 14.7 grams of liquid product were dissolved in n-pentane and maintained at −35° C. for 30 minutes. The cold pentane solution was filtered and 5.0 grams of chlorodecaborane were obtained. The pentane was removed under reduced pressure and the remaining liquid was distilled at a temperature of 84 to 95° C. and a pressure of 1.0 mm. Hg absolute. As shown in Table III, Fractions 3 and 4, 6.6 grams, boiling between 87 and 95° C. were alpha-chloroethyldecaborane. This example is summarized in Table III.

TABLE III

| Distillation Fractions | Boiling Point, °C. | Absolute Pressure, mm. Hg | Weight, g. | Boron, Percent | Chlorine, Percent | Mol. Wt. | Remarks |
|---|---|---|---|---|---|---|---|
| 1 | 71-79 | 0.45 | 14.7 | | | | Liquid which partially solidified. |
|   Dissolved in n-pentane. | | | | | | | |
|   -1 | | | 5.0 | | | | n-Pentane solution cooled to −60° C. and 5.0 g. of chlorodecaborane removed on a filter. |
|   -2 | 84-87 | 1.0 | 1.5 | | | | n-Pentane removed. Mainly ethylated decaboranes. |
|   -3 | 87-89 | 1.0 | 3.5 | | | | } Fractions 3 and 4 are identical by their infrared spectra to alpha-chloroethyldecaborane. |
|   -4 | °90-95 | 1.0 | 3.1 | | | | |

° Superheating occurred.

Example VII

A 200 ml. flask equipped with a magnetic stirrer, nitrogen source, an addition funnel and reflux condenser was charged with 24.4 grams (0.2 mole) of decaborane and 3 grams (0.02 mole) of aluminum chloride. This mixture was heated until the decaborane began to soften. Agitation was started and 18.8 grams (0.1 mole) of ethylene bromide were added dropwise to the molten mixture of decaborane and aluminum chloride over a period of 20 minutes. The mixture was heated to 120° C. for 35 minutes. During the first 15 minutes of the reaction, 0.1 mole of hydrogen bromide was evolved. At 20 minutes all of the ethylene bromide had been added and 0.15 mole of hydrogen bromide had been evolved. As soon as all of the ethylene bromide was added, the reaction ceased. The reaction system was swept with nitrogen for approximately 5 minutes and an additional 0.02 mole of hydrogen bromide was obtained. This gave a total of 0.17 mole of hydrogen bromide evolution. No additional hydrogen bromide was evolved after an additional 15 minutes of heating. The reaction mixture was cooled, hydrolyzed and the product isolated by extraction of the reaction mixture with benzene. Distillation of the benzene layer gave 7.5 grams of a liquid boiling at 85 to 100° C. at an absolute pressure of 0.8 mm. of mercury, 6.0 grams of unreacted decaborane and 15.5 grams of a polymeric solid. The polymeric solid contained 58.9, 60.7 weight percent boron and 20.3, 18.6 weight percent bromine.

The 7.5 grams of liquid were dissolved in n-pentane and cooled to −60° C. in order to remove any remaining decaborane. An additional 2.1 grams of decaborane were removed upon filtering the cooled liquid. The n-pentane was removed from the filtrate under reduced pressure and the remaining liquid distilled through a simple fractionating column.

The fraction boiling between 82 to 99° C. at an absolute pressure of 0.8 to 1.0 mm. of mercury weighed 1.3 grams and consisted mainly of ethyldecaborane and a small amount of decaborane as shown by the infrared spectra. The fraction boiling between 101 and 105° C. at an absolute pressure of 0.8 mm. of mercury weighed 2.5 grams. The elemental analysis showed that the material contained 48.3 (46.8, 49.8) weight percent boron and 35.1 (35.0, 35.2) weight percent bromine. The product was thus beta-bromoethyldecaborane of the formula $B_{10}H_{13}CH_2CH_2Br$ which has 47.2 weight percent boron and 34.9 weight percent bromine.

The compounds of this invention can be employed as ingredients of solid propellant compositions in accordance with the general procedures which are well understood in the art, inasmuch as the compounds are readily oxidized using conventional solid oxidizers such as ammonium perchlorate, potassium perchlorate, sodium perchlorate, lithium perchlorate, ammonium nitrate and the like. In formulating a solid propellant composition employing one or more of the compounds produced in accordance with the present invention, generally from 5 to 35 parts by weight of the compound or compounds containing boron and from 65 to 95 percent by weight of oxidizer salt are present in the final propellant composition. In the propellant composition, the oxidizer salt and the compound or compounds of this invention are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based on the weight of oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596.

What is claimed is:

1. The compounds selected from the class consisting of $B_{10}H_{13}$—CHBr—$B_{10}H_{13}$, $B_{10}H_{13}$—$CH_2CH_2X$ and $B_{10}H_{13}$—CH(R)—X wherein R is selected from the group consisting of hydrogen and methyl and X is selected from the group consisting of bromine and chlorine.

2. $B_{10}H_{13}$—CHBr—$B_{10}H_{13}$.

3. $B_{10}H_{13}$—$CH_2Cl$, having a melting point of about 52–53.5° C.

4. $B_{10}H_{13}$—$CH_2Br$ having a melting point of about 48–50.5° C.

5. $B_{10}H_{13}$—CH(Cl)$CH_3$.

6. Beta-bromoethyldecaborane of the formula $$B_{10}H_{13}-CH_2CH_2Br$$

7. A method for the preparation of a compound selected from the class consisting of $B_{10}H_{13}$—$CH_2CH_2X$ and $B_{10}H_{13}$—CH(R)—X which comprises reacting decaborane and a compound selected from the group consisting of ethylene dibromide, ethylene dichloride and a compound of the class $RCHX_2$ at a temperature within the range from about 50° C. to 200° C. while the reaction mixture contains a catalytic amount of a material selected from the group consisting of aluminum bromide, aluminum chloride, ferric bromide, and ferric chloride, providing that where an ethylene halide is employed, the catalyst is aluminum bromide or aluminum chloride, R being selected from the group consisting of hydrogen and methyl and X being selected from the group consisting of bromine and chlorine.

8. The method of claim 7 wherein R is hydrogen, X is chlorine and said material is aluminum bromide.

9. The method of claim 7 wherein R is hydrogen, X is bromine and said material is aluminum bromide.

10. The method of claim 7 wherein R is methyl, X is chlorine and said material is aluminum chloride.

11. The method of claim 7 wherein R is methyl, X is chlorine and said material is ferric chloride.

12. The method of claim 7 wherein the compound is ethylene dibromide and wherein said material is aluminum chloride.

No references cited.